US008027793B2

United States Patent
Ellender et al.

(10) Patent No.: US 8,027,793 B2
(45) Date of Patent: Sep. 27, 2011

(54) METHOD AND SYSTEM OF VALIDATING DATA REGARDING MEASURED HYDROCARBON FLOW

(75) Inventors: Damon J. Ellender, Loftus (AU);
Duane B. Toavs, Taylor, TX (US)

(73) Assignee: Daniel Measurement and Control, Inc., Houston, TX (US)

( * ) Notice: Subject to any disclaimer, the term of this patent is extended or adjusted under 35 U.S.C. 154(b) by 504 days.

(21) Appl. No.: 11/774,714

(22) Filed: Jul. 9, 2007

(65) Prior Publication Data

US 2008/0125916 A1    May 29, 2008

Related U.S. Application Data

(60) Provisional application No. 60/806,879, filed on Jul. 10, 2006.

(51) Int. Cl.
*G01F 1/00* (2006.01)
*G05B 15/02* (2006.01)
(52) U.S. Cl. .................... 702/45; 73/861; 700/9
(58) Field of Classification Search .......... 702/45, 702/50, 55, 85, 98–100, 127, 130, 138, 176, 702/179, 182, 188–189, 199, 12–13; 700/1, 700/9, 281, 282; 137/1–2, 14, 87.02–87.04, 137/561 R, 825, 12; 73/863.03, 1.57, 170.14, 73/700, 708, 861; 340/500, 506, 540, 870.02, 340/870.04–870.05, 870.16
See application file for complete search history.

(56) References Cited

U.S. PATENT DOCUMENTS

| | | | |
|---|---|---|---|
| 6,366,217 B1 * | 4/2002 | Cunningham et al. | 340/870.31 |
| 6,568,416 B2 * | 5/2003 | Tucker et al. | 137/14 |
| 6,792,361 B2 * | 9/2004 | Vun Cannon | 702/46 |
| 6,978,210 B1 * | 12/2005 | Suter et al. | 702/13 |
| 7,054,764 B2 * | 5/2006 | Williams et al. | 702/45 |
| 2002/0161866 A1 | 10/2002 | Tozer et al. | |
| 2005/0011258 A1 | 1/2005 | Gysling | |
| 2005/0288897 A1 | 12/2005 | Archer et al. | |
| 2006/0009881 A1 * | 1/2006 | Ferber et al. | 700/282 |

FOREIGN PATENT DOCUMENTS

| | | |
|---|---|---|
| EP | 0786648 A1 | 7/1997 |
| WO | 0036380 A1 | 6/2000 |

OTHER PUBLICATIONS

Hillhouse, M.M., Systemwide Power Plant Performance Monitoring Using Microcomputers, May 1988, IEEE Transactions on Power Systems, vol. 3, No. 2, pp. 684-688.*

(Continued)

*Primary Examiner* — Michael Nghiem
*Assistant Examiner* — Toan Le
(74) *Attorney, Agent, or Firm* — Mark E. Scott; Conley Rose, P.C.

(57) ABSTRACT

A method and system of validating data regarding measured hydrocarbon flow. At least some of the illustrative embodiments are systems including a flow computer coupled to a metering tube and configured to measure fluid flow through the metering tube, and a supervisory control and data acquisition (SCADA) system coupled to the flow computer. The SCADA system is configured to perform a validation on data provided by the flow computer regarding fluid flow. The flow computer is configured to perform the validation on the data regarding fluid flow, and the if the validation is successfully completed by the flow computer, the SCADA system refrains from performing the validation.

22 Claims, 2 Drawing Sheets

OTHER PUBLICATIONS

Heng, G.T., Microcomputer-Based Remote Terminal Unit for a SCADA System, 1996, Microprocessors and Microsystems 20, pp. 39-45.*

Rans, R., Transmitter Data and Redundancy Manage Measurement Impacts, 2005 Canadian School of Hydrocarbon Measurement, pp. 1-18.*

International Search Report for PCT/US2007/073108 dated Mar. 24, 2008; 2pp.

Supplementary EPO Search Report for EPO Patent Application No. 07840376.3, filed Feb. 5, 2009.

* cited by examiner

METHOD AND SYSTEM OF VALIDATING DATA REGARDING MEASURED HYDROCARBON FLOW

CROSS-REFERENCE TO RELATED APPLICATIONS

This application claims the benefit of provisional application Ser. No. 60/806,879, filed Jul. 10, 2006, and entitled "A Method And System Of Validating Data Regarding Measured Hydrocarbon Flow", now expired, which application is incorporated by reference herein as if reproduced in full below.

BACKGROUND

Custody transfer for hydrocarbons (e.g., natural gas) occurs on an almost continuous basis (e.g., custody transfer between a natural gas producer and a natural gas distributor). However, billing for hydrocarbons in most cases takes place on a periodic basis, such as bi-weekly or monthly. In the span of time between billing cycles, an accumulated flow volume is maintained and incremented, in some cases by way of a flow computer coupled to one or more metering tubes through which the hydrocarbons flow.

Prior to billing for the sale of the hydrocarbons, the accumulated flow volume is transferred to a computer system, such as a supervisory control and data acquisition (SCADA) system. The SCADA system performs various checks on the accumulated flow volume using raw and/or uncorrected values of pressure, differential-pressure and temperature associated with measuring hydrocarbon flow. These "checks" are referred to in the industry as performing "validations." There may be many validations performed by the SCADA system, but in the related-art the validations are performed for the data over the entire billing cycle (e.g., a month of data), just before the next billing. Thus, if errors arise in the data just after the beginning of a billing cycle, an entire billing cycle worth of data may be corrupted.

BRIEF DESCRIPTION OF THE DRAWINGS

For a detailed description of the various embodiments of the invention, reference will now be made to the accompanying drawings in which.

NOTATION AND NOMENCLATURE

Certain terms are used throughout the following description and claims to refer to particular system components. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

"Validations," and "validating" shall refer to various calculations performed on data of a measured hydrocarbon flow to directly or indirectly ensure that the accumulated flow volume is accurate to a degree of certainty. "Validations," and "validating" shall not refer to checks as to the calibration state of any devices used to gather the raw data of measured hydrocarbon flow.

DETAILED DESCRIPTION

Figure 1:
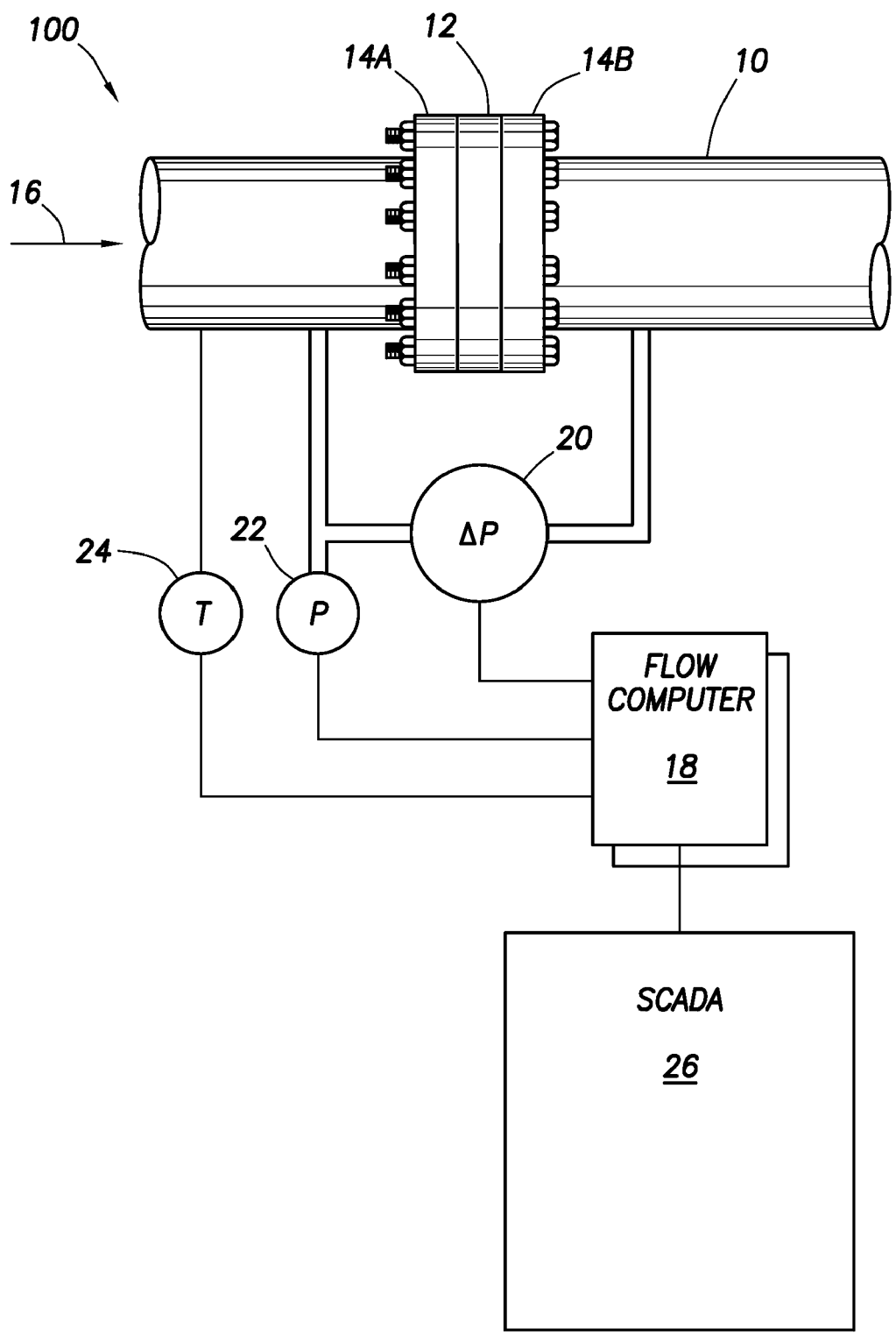
FIG. 1 shows a system in accordance with at least some embodiments.

FIG. 1 illustrates a system 100 in accordance with at least some embodiments. In particular, the system 100 comprises a metering tube 10 within which an orifice plate 12 is disposed. In the illustrative system of FIG. 1, the orifice plate 12 is held in place by a set of flanges 14; however, other systems for holding the orifice plate within the metering tube 10 may be equivalently used (e.g., Daniel SENIOR® Orifice Fitting available for Emerson Process Management of St. Louis, Mo.). Fluid (e.g., natural gas) may flow through the metering tube 10 in the direction indicated by arrow 16, which flow causes a pressure drop across the orifice plate 12.

In order to calculate the instantaneous flow rate and to accumulate flow volume over time, system 100 comprises a flow computer 18 coupled to various temperature and pressure measurement devices. A single flow computer 18 may couple to and calculate flow through a plurality of metering tubes based on the various temperature and pressure measurements. Moreover, systems in accordance with other embodiments may comprise a plurality of metering tubes and thus a plurality of flow computers. Illustrative flow computer 18 electrically couples to a delta-pressure (delta-P) transmitter 20, upstream pressure transmitter 22, and in some cases upstream temperature transmitter 24. The delta-P transmitter fluidly couples upstream of the orifice 12 and downstream of the orifice 12, and provides to the flow computer 18 an indication of the pressure differential across the orifice plate caused by the flow of fluids. Pressure transmitter 22 fluidly couples upstream of the orifice plate 12 and provides to the flow computer 18 an indication of the upstream pressure. Likewise, temperature transmitter 24 measures temperature upstream of the orifice plate and provides the temperature to the flow computer 18. Using the measured pressure across the orifice plate, upstream pressure and in some cases upstream temperature, the flow computer: calculates an instantaneous flow rate of fluid through the metering tube 10; and accumulates or integrates the instantaneous flow rate to calculate the volume flow of fluids over time.

Still referring to FIG. 1, the system 100 further comprises a supervisory control and data acquisition (SCADA) system 26 coupled to the flow computer 18. In most situations, the SCADA system 26 couples to a number of flow computers associated with plurality of metering tubes as well as other processor control devices. As the name implies, the SCADA system 26 may perform some control (of systems not specifically shown), and also is the central repository for data gathered by flow computer 18 from various transmitters as well as values calculated by the flow computer 18. In particular, the SCADA system 26 periodically queries the flow computer 18 for data, such as accumulated flow volume and the raw pressures and temperatures used to calculate the accumulated flow volume. The period of the accumulation may be related to the billing cycle for the fluids moving through the metering tube 10, such as bi-weekly or monthly.

The SCADA system 26 is further configured to perform validations on the accumulated data prior to billing. For example, the SCADA system may calculate average pressure and an average temperature from the raw temperatures and pressures, calculate an average uncorrected flow volume using the average values, and compare the uncorrected flow volume to the accumulated flow volume as a check to ensure the accumulated flow volume is not too far removed. Other validations are possible as well, such as: calculating standard deviations on the raw temperature and pressure data to identify excursions; linearization of the temperature and pressures; or a check for bias in any of the raw temperature and pressure data.

In accordance with the various embodiments, the flow computer 18 is also configured to perform one or more of the validations mentioned above, or any other such validation. The validations performed by the flow computer 18 serve several purposes. First, the validations performed by the flow computer 18 may take place more often than if those validations are performed only by the SCADA system 26, as the data is only periodically transferred from the flow computer 18 to the SCADA system 26. Because the validations are performed more often, they may be performed earlier in the billing cycle, which enables the system 100 to identify potential flow calculation problems and provide an alarm to the SCADA system 26 early in the billing cycle. Moreover, in some embodiments the flow computer is configured to, where possible, correct errors identified by the flow computer-run validations. Second, in accordance with the various embodiments, when a validation is successfully run by the flow computer 18 the SCADA system 26 need not repeat those validations after transfer of the data to the SCADA system 26.

Figure 2:
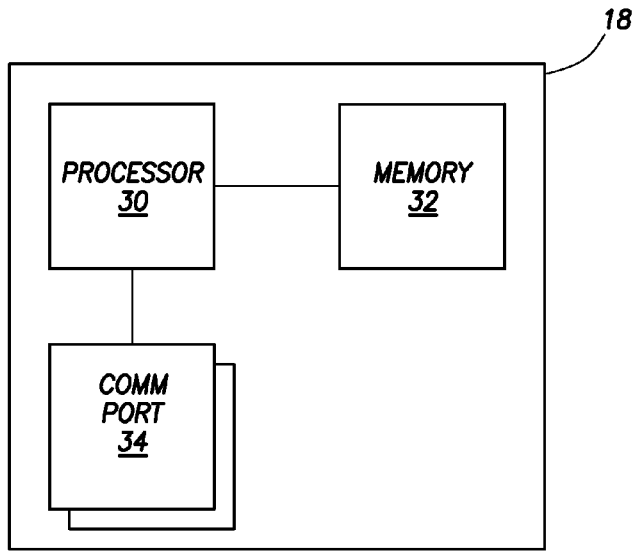
FIG. 2 shows a flow computer in accordance with at least some embodiments.

FIG. 2 is an electrical block diagram of a flow computer 18 in accordance with at least some embodiments. In particular, the flow computer 18 comprises a processor 30 coupled to a memory 32. The memory 32 may comprise a read-only memory that stores programs accessed and executed by the processor 30, and the memory 32 may also comprise random access memory. Executing programs stored in the memory 32, the processor is configured to calculate instantaneous flow rate through a metering tube, and also to accumulate flow volume over time. In some embodiments the processor couples to communication ports 34. The communication ports 34 couple to the SCADA system 26, and may also be the mechanism by which the processor couples to the various temperature and pressure transmitters. Executing programs stored on the memory 32, the flow computer 18 may also perform validations as discussed above, provide an alarm signal to the SCADA system 26 in the event one of the validations is unsuccessful, and in some embodiments correct the raw data and/or accumulated flow volume if the validations are unsuccessful.

Performing validations is a processor intensive operation. Flow computers 18 configured to perform validations may utilize processors with more computing power than flow computers that are not so configured. The computing power used for validations thus drives up cost flow computers in relation to their brethren flow computers not so configured. For a particular process environment, given the higher number of flow computers the process may use in relation to the number of SCADA systems, the increased cost of each flow computer having the ability to perform validations militates against one of ordinary skill considering the possibility of configuring a flow computer to perform such validations, especially in the presence of SCADA systems that already have the validation ability. However, the inventors of the present specification realized that not only can flow computers be configured to perform validations, but the cost savings associated with early identification of errors in billing regarding hydrocarbon exchange may quickly overcome any additional cost in having flow computer configured to perform validations.

Figure 3:
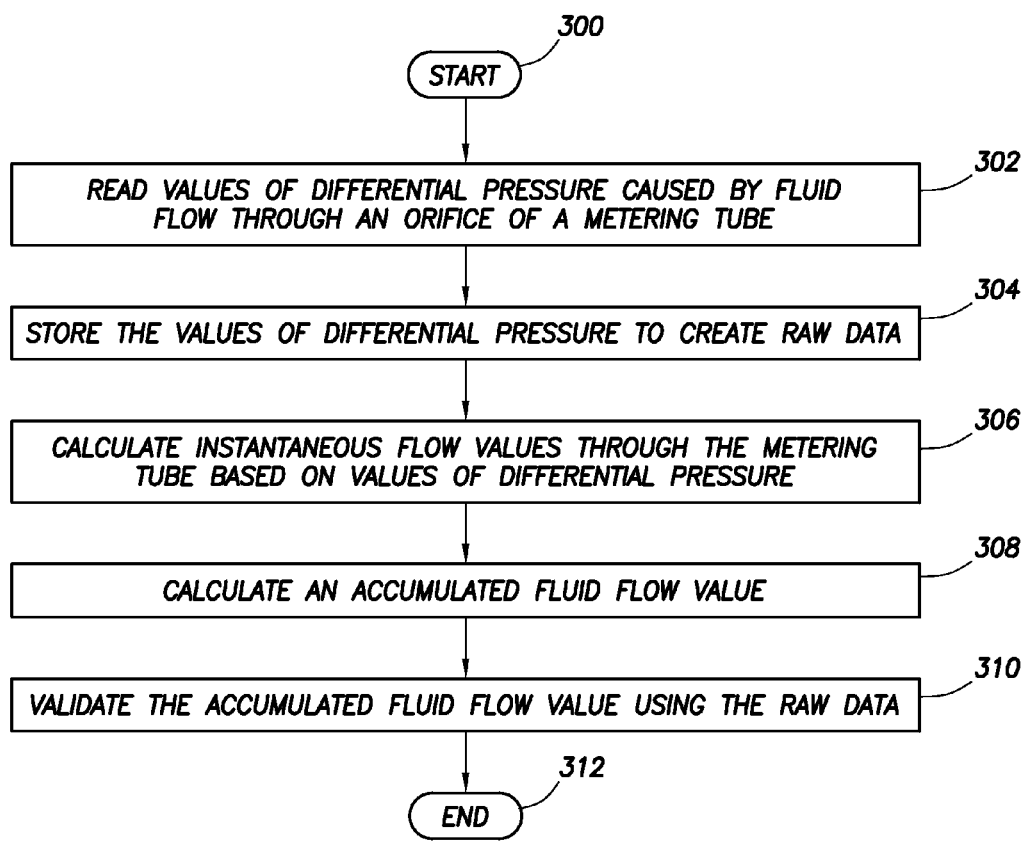
FIG. 3 shows an illustrative method in accordance with various embodiments.

FIG. 3 illustrates a method in accordance with at least some embodiments. Some of various portions of the illustrative method may be equivalently performed in a different order, or omitted all together, and yet the benefits of the various embodiments still realized. The method starts (block 300) and proceeds to read values of differential-pressure caused by fluid flow through an orifice of a metering tube (block 302). Because, other downstream equipment may desire to obtain the data, the method then proceeds to store the values of differential pressure (and possibly other parameters used to calculate fluid flow) to create raw data (block 304). Using the values of differential pressure (and possibly other parameters), instantaneous flow values through the metering tube are calculated (block 306). Based, at least in part, on the instantaneous flow values, the method calculates an accumulated fluid flow value (block 308). Periodically, the method validates the accumulated fluid flow value using, at least in part, the raw data (block 310), an the method ends (block 312). In response to a successful validation, downstream devices (e.g., a SCADA system) may refrain from repeating the validations.

From the description provided herein, those skilled in the art are readily able to combine software created as described with appropriate general purpose or special purpose computer software to create a computer system and/or computer subcomponents in accordance with the various embodiments, to create a computer system and/or computer subcomponents for carrying out the methods of the various embodiments and/or to create a computer-readable media for storing a software program (e.g., an operating system) to implement the method aspects of the various embodiments.

The above discussion is meant to be illustrative of the principles and various embodiments of the present invention. Numerous variations and modifications will become apparent to those skilled in the art once the above disclosure is fully appreciated. For example, the various embodiment discussed to this point couple to orifice-type flow meters; however, the flow computer may couple to any metering system that uses metering correction for pressure, temperature, and/or gas composition (e.g., orifice-type, ultrasonic flow meter, turbine flow meter, and positive displacement), and thus the various embodiments and claims shall be construed as limited to only orifice-type meters. It is intended that the following claims be interpreted to embrace all such variations and modifications.

What is claimed is:

1. A system comprising:
    a flow computer coupled to a metering tube and configured to measure fluid flow through the metering tube; and
    a supervisory control and data acquisition (SCADA) system coupled to the flow computer;
    wherein the SCADA system is configured to perform a validation on data provided by the flow computer regarding fluid flow;
    wherein the flow computer is configured to perform the validation on the data regarding fluid flow, and if the validation is successfully completed by the flow computer, the SCADA system refrains from performing the validation.

2. The system according to claim 1 wherein the flow computer is configured to alarm if the validation fails.

3. The system according to claim 1 wherein the flow computer performs the validation more often than once per billing cycle of measured fluid flow.

4. The system as defined in claim 1 wherein the flow computer is configured to correct the data regarding fluid flow if the validation fails.

5. The system according to claim 1 wherein when the flow computer performs the validation, the flow computer is configured to calculate average pressure and average temperature from raw temperatures and pressures, calculate an average uncorrected flow volume using the average values, and compare the uncorrected flow volume to the accumulated flow volume.

6. The system according to claim 1 wherein when the flow computer performs the validation, the flow computer is configured to calculating standard deviations on temperature and pressure data and to identify excursions.

7. The system according to claim 1 wherein when the flow computer performs the validation, the flow computer is configured to check for bias in at least one selected from the group consisting of: temperature data; and pressure data.

8. A flow computer comprising:
a processor; and
a memory coupled to the processor;
wherein the processor is configured to couple to transmitters associated with a metering tube, to perform fluid flow calculations to create fluid flow data, and to store the fluid flow data for later transfer to a supervisory control and data acquisition (SCADA) system; and
wherein the processor is configured to perform a validation on the fluid flow data prior to transfer of the fluid flow data to the SCADA system, and if the validation is successfully completed by the flow computer the SCADA system refrains from performing the validation.

9. The flow computer according to claim 8 wherein the processor is configured to generate an alarm if the validation fails.

10. The flow computer according to claim 9 wherein the processor is configured to send the alarm to the SCADA system.

11. The flow computer according to claim 8 wherein the processor is configured to correct the fluid flow data if the validation fails.

12. The flow computer according to claim 8 wherein the processor is configured to perform the validation more often than a periodic billing cycle for the fluid flow.

13. The flow computer according to claim 8 wherein when the processor performs the validation, the processor is configured to calculate average pressure and average temperature from temperatures and pressures, calculate an average uncorrected flow volume using the average values, and compare the uncorrected flow volume to the fluid flow data.

14. A method comprising:
reading values of differential-pressure caused by fluid flow through an orifice of a metering tube, the reading by a flow computer operationally coupled to the metering tube;
storing on the flow computer the values of differential pressure to create raw data;
calculating by the flow computer instantaneous flow values through the metering tube based on values of differential pressure;
calculating by the flow computer an accumulated fluid flow value based on the instantaneous flow values; and
validating by the flow computer the accumulated fluid flow value using the raw data; and if the validation is successfully completed by the flow computer refraining from performing the validation by a supervisory control and data acquisition (SCADA) system coupled to the flow computer.

15. The method according to claim 14 further comprising:
reading by the flow computer values of pressure upstream of the orifice plate;
storing on the flow computer the values of pressure upstream as part of the raw data;
wherein calculating the instantaneous flow values further comprises calculating based on the values of differential pressure and the values of pressure upstream.

16. The method according to claim 14 further comprising:
sending by the flow computer the accumulated fluid flow value to a supervisory control and data acquisition (SCADA) system; and
sending by the flow computer an indication of whether the validating was successful.

17. The method according to claim 14 further comprising correcting the accumulated fluid flow value by the flow computer if the validating was unsuccessful.

18. The method according to claim 14 further comprising sending the flow computer an alarm to a supervisory control and data acquisition (SCADA) system if the validating was unsuccessful.

19. A non-transitory computer-readable medium storing a program that, when executed by a processor, causes the processor to:
read data values from transmitters associated with a metering tube;
calculate instantaneous flow values based on the data values;
accumulate the instantaneous flow values to create accumulated flow value;
provide the accumulated flow value to a supervisory control and data acquisition (SCADA) system upon request from the SCADA system; and
validate the accumulated flow values using the data value, and if the validation is successfully completed by a flow computer the SCADA system refrains from performing the validation.

20. The non-transitory computer-readable medium according to claim 19 where when the processor reads data values, the program causes the processor to read data values being at least one selected from the group consisting of: temperature upstream of an orifice plate; pressure upstream of the orifice plate; and differential pressure across the orifice plate.

21. The non-transitory computer-readable medium according to claim 19 wherein when the processor validates, the program causes the processor to validate the accumulated flow values more often than a periodic billing cycle for the fluid flow.

22. The non-transitory computer-readable medium according to claim 19 wherein when the processor validates, the program causes the processor to calculate average pressure and average temperature, calculate an average uncorrected flow volume using the average values, and determine a different between the uncorrected flow volume to the accumulated flow value.

* * * * *